US000001051H

United States Statutory Invention Registration [19]

[11] Reg. Number: H1051

Briguglio

[43] Published: May 5, 1992

[54] ANTENNA STABILIZING BUOY

[75] Inventor: Emanuel Briguglio, Bethesda, Md.

[73] Assignee: Government of the United States, Washington, D.C.

[21] Appl. No.: 698,418

[22] Filed: May 10, 1991

[51] Int. Cl.[5] ..... B63B 22/20

[52] U.S. Cl. ..... 441/28; 441/11; 441/21

[56] References Cited

U.S. PATENT DOCUMENTS

| | | | |
|---|---|---|---|
| 3,093,808 | 6/1963 | Tatnall et al. | 441/25 |
| 3,893,123 | 7/1975 | Bieser | 343/706 |
| 4,353,071 | 10/1982 | Bernstein et al. | 343/709 |
| 4,639,227 | 1/1987 | Rademakers | 441/1 |
| 4,675,686 | 6/1987 | Robinson et al. | 441/30 |

*Primary Examiner*—Michael J. Carone

*Attorney, Agent, or Firm*—Thomas E. McDonnell; Peter T. Rutkowski

[57] ABSTRACT

A surface floating buoy has an antenna attached to a linkage system which pivots about the floating buoy. The linkage system is attached to a counterweight such that the antenna is maintained at a desired vertical position with respect to the surface of a body of water by pantographic action. The floating buoy contains a hollow cavity of sufficient size to hold the linkage system antenna and counterweight prior to deployment in a body of water. Upon deployment in the water, gravitational forces on the counterweight and linkage system cause the system to be deployed. The invention may also include a servo feedback system for more accurately positioning the antenna at its desired position.

20 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ANTENNA STABILIZING BUOY

FIELD OF THE INVENTION

This invention relates to sonobuoys, and more particularly to an antenna stabilizing deployable mast system for a surface floating buoy.

BACKGROUND OF THE INVENTION

Surface floating buoys have been used as platforms to support antennas and a variety of other sensors, e.g. optical devices, magnetic sensors, etc. The heave response of such a buoy serves to maintain the sensor above the surface of the water. Heretofore, antennas have been directly attached to the body of the buoy. As a result, the antennas have tended to bobble and roll with the buoy due to the action of waves and wind. This angular displacement can severely degrade antenna directivity performance objectives.

SUMMARY OF THE INVENTION

Accordingly, it is an object of the present invention to provide a deployable mast of sufficient height for a sensor to view over ocean waves and at the same time provide the sensor with isolation to angular displacement by wind and waves.

It is another object of the present invention to provide a deployable mast having linkage of a type that can be folded and packaged completely within the main body of a hollow buoy.

The present invention accomplishes these objectives by providing a sonobuoy with both heave response and vertical stability. This is accomplished, in brief, by attaching the sensor to an element of a linkage system which pivots about a surface floating buoy. A counterweight is attached to an additional element of the linkage system such that the sensor is maintained at a desired vertical orientation by pantographic action.

BRIEF DESCRIPTION OF THE DRAWINGS

A more complete appreciation of the invention will be readily obtained by reference to the following description of the Preferred Embodiments and the accompanying drawings in which like numerals in different figures represent the same structures or elements wherein.

DETAILED DESCRIPTION

Figure 1:
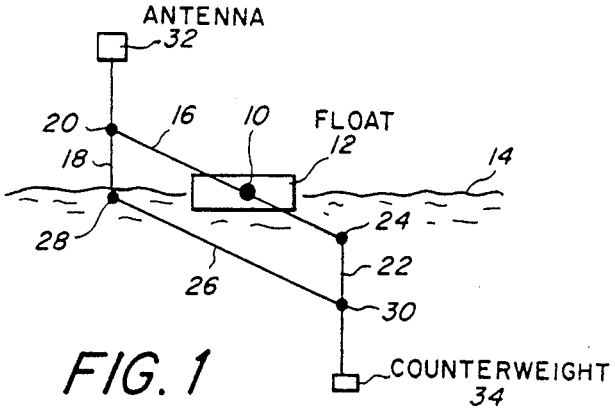
FIG. 1 illustrates a single four-bar linkage system with preloaded torsion hairpin springs where the linkage element attached to the antenna remains vertical irrespective of the displacement of the flotation element.
Figure 1A:
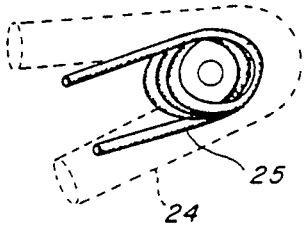
FIG. 1A illustrates in greater detail one of the joints and its preloaded torsion hairpin spring as used in FIG. 1.

FIG. 1 illustrates a single four-bar linkage system with preloaded torsion hairpin springs. A pivot support 10 is mounted on a flotation element 12 resting on the surface 14 of a body of water. A first bar 16 is mounted to pivot about the pivot support 10 at a point on the first bar between its end points. A second bar 18 is attached at a point between its end points by a first pivot joint 20 with a preloaded torsion hairpin spring to an end point of the first bar 16. A third bar 22 is attached at one of its end points by a second pivot joint 24 with a preloaded torsion hairpin spring to the end point of the first bar 16 opposite to the end point of the first bar attached to the second bar 18. FIG. 1A illustrates in more detail the second pivot joint 24 and its associated preloaded torsion hairpin spring 25.

A fourth bar 26 is attached at one end point by a third pivot joint 28 with a preloaded torsion hairpin spring to one end point of the second bar 18. The fourth bar 26 is attached at the end point of the fourth bar opposite to the end point attached to the second bar 18 by a fourth pivot joint 30 with a preloaded torsion hairpin spring to a point on the third bar 22 between its end points. All pivot joints 20, 28 and 30 have preloaded torsion hairpin springs similar to pivot joint 24.

An antenna 32 is attached to the second bar 18 at the end point of the second bar opposite to the end point of the second bar attached to the fourth bar 26. A counterweight 34 is attached to the third bar 22 at the end point of the third bar opposite to the end point attached to the first bar 16. This counterweight 34 maintains the antenna 32 in a fixed vertical orientation with respect to the surface of a body of water through pantographic action, irrespective of the angular motion and displacement of the other linkage elements.

Figure 2:
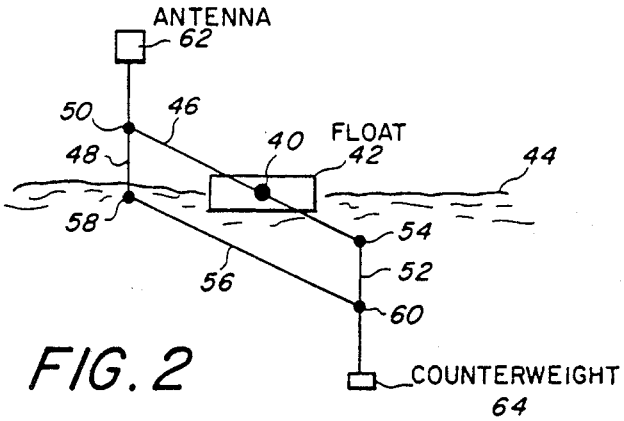
FIG. 2 illustrates a single four-bar linkage system with telescoping air spring viscous dampers where the linkage element attached to the antenna remains vertical irrespective of the displacement of the flotation element.
Figure 2A:
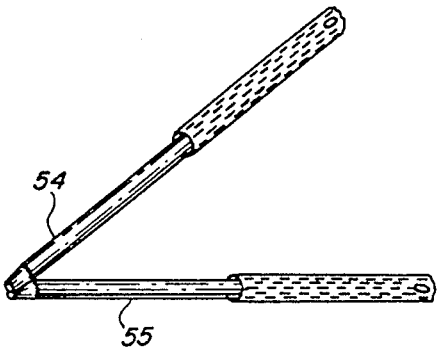
FIG. 2A illustrates in greater detail one of the joints and its telescoping air spring viscous damper as used in FIG. 2.

FIG. 2 illustrates a single four-bar linkage system with telescoping air spring viscous dampers. A pivot support 40 is mounted on a flotation element 42 resting on the surface 44 of a body of water. A first bar 46 is mounted to pivot about the pivot support 40 at a point on the first bar between its end points. A second bar 48 is attached at a point between its end points by a first pivot joint 50 with a telescoping air spring viscous damper to an end point of the first bar 46. A third bar 52 is attached at one of its end points by a second pivot joint 54 with a telescoping air spring viscous damper to the end point of the first bar 46 opposite to the end point of the first bar attached to the second bar 48. FIG. 2A illustrates in more detail the second pivot joint 54 and its associated telescoping air spring viscous damper 55.

A fourth bar 56 is attached at one end point by a third pivot joint 58 with a telescoping air spring viscous damper to one end point of the second bar 48. The fourth bar 56 is attached at the end point of the fourth bar opposite to the end point attached to the second bar 48 by a fourth pivot joint 60 with a telescoping air spring viscous damper to a point on the third bar 52 between its end points. All pivot joints 50, 58, and 60 have telescoping air spring viscous dampers similar to pivot joint 54.

An antenna 62 is attached to the second bar 48 at the end point of the second bar opposite to the end point of the second bar attached to the fourth bar 56. A counterweight 64 is attached to the third bar 52 at the end point of the third bar opposite to the end point attached to the first bar 46. This counterweight 64 maintains the antenna 62 in a fixed vertical orientation with respect to the surface of a body of water through pantographic action, irrespective of the angular motion and displacement of the other linkage elements.

Figure 3:
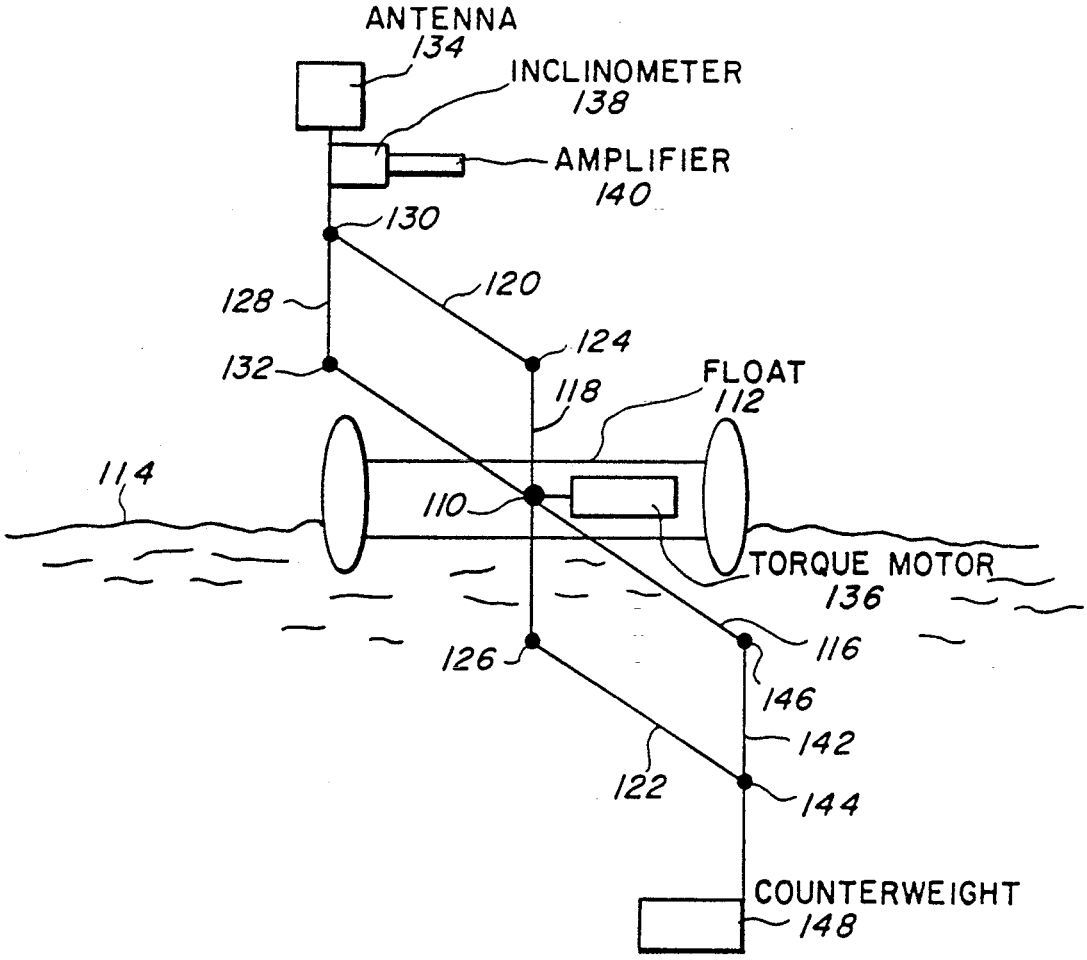
FIG. 3 illustrates a combination of two four-bar linkage systems with a servo feedback stabilizing system where the linkage element attached to the antenna remains vertical irrespective of the displacement of the flotation element.

FIG. 3 illustrates a combination of multiple four-bar linkage systems with a servo feedback stabilizing system. A pivot support 110 is mounted on a flotation element 112 having a hollow space. The flotation element 112 rests on the surface of a body of water 114.

A first bar 116 is mounted to pivot about the pivot support 110 at a point on the first bar between its end points. A second bar 118 is connected at a point between its end points to the first bar 116 at the pivot support 110. A third bar 120 and fourth bar 122 are attached, each at one of its end points respectively, by a first pivot joint 124 and a second pivot joint 126 to respective opposite end points of the second bar 118. A fifth bar 128 is connected at a point between its end points by a third pivot joint 130 to the end point of the third bar 120 opposite to the end point connected to the second bar 118. The fifth bar 128 is connected at one of its end points by a fourth pivot joint 132 to an end point of the first bar 116. An antenna 134 is supported by the fifth bar 128 at the end point of the fifth bar opposite to the end point connected to the first bar 116.

Figure 3A:
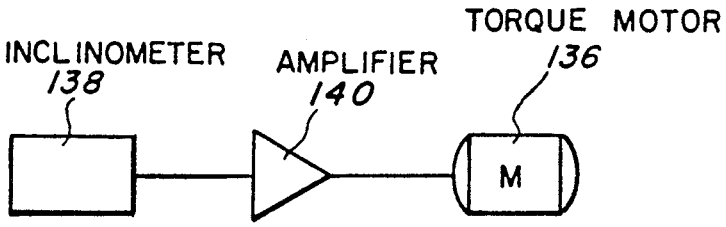
FIG. 3A illustrates the servo feedback stabilizing system as used in FIG. 3.

A torque motor 136 is attached to the flotation element 112. An inclinometer transducer 138 is attached to the fifth bar 128 at a point between the end points of the fifth bar. An amplifier 140 is attached to the inclinometer transducer 138. The inclinometer transducer 138 measures the angular displacement from vertical of the antenna 134 and transmits a signal to the amplifier 140. The amplifier 140 magnifies the signal from the inclinometer transducer 138 and transmits a signal to the torque motor 136. The torque motor 136 responds to a signal from the amplifier 140 by turning the mast at the pivot support 110, thus maintaining the antenna 134 at the desired pointing angle. FIG. 3A illustrates the torque motor 136, inclinometer transducer 138, and amplifier 140 of the servo feedback system. Highly accurate active stabilization or antenna sensor pointing can be compensated or controlled by this simple servo feedback system. This servo system can measure the angular error difference from vertical due to wind and servo the antenna to the desired pointing angle.

A sixth bar 142 is connected at a point between its end points by a fifth pivot joint 144 to the fourth bar 122 at the end point of the fourth bar opposite to the end point connected to the second bar 118. The sixth bar 142 is connected at one of its end points by a sixth pivot joint 146 to the first bar 116 at the end point of the first bar opposite to the point which is connected to the fifth bar 128. A counterweight 148 is supported by the sixth bar 142 at the end point of the sixth bar opposite to the end point connected to the first bar 116. This counterweight 148 maintains the antenna 134 in a fixed vertical orientation with respect to the surface of a body of water through pantographic action, irrespective of the angular motion and displacement of the other linkage elements.

The flotation element 112 has a hollow space of sufficient size to hold the pivot support 110; bars 116, 118, 120, 122, 128, and 142; pivot joints 124, 126, 130, 132, 144, and 146; antenna 134; torque motor 136; inclinometer transducer 138; amplifier 140; and counterweight 148. The pivot support 110; bars 116, 118, 120, 122, 128 and 142; pivot joints 124, 126, 130, 132, 144, and 146; antenna 134; torque motor 136; inclinometer transducer 138; amplifier 140; and counterweight 148 are positioned within the hollow space of the flotation element 112 and extend therefrom when the flotation element 112 is deployed in the water. When this buoy is deployed on the ocean surface, the mast linkage which is folded within the buoy envelope, extends due to gravitational forces on the submerged weight and mast elements. Placing the elements of the linkage system within the body of the flotation element makes this flotation device more compact and convenient. This linkage will also provide a certain amount of isolation to the antenna due to the wave motion(heave) since wave motion induces vertical forces on the pivot and not directly on the mast. The importance of this is that the vertical amplitude displacement of the antenna can be reduced by manipulating the natural period and frequencies of the antenna/linkage against the forcing functions of the ocean waves on the buoy(pivot).

The invention has been described in detail with particular reference to certain preferred embodiments thereof. It is therefore to be understood that within the scope of the appended claims, the invention may be practiced otherwise than as specifically described.

What is claimed is:

1. A sensor stabilizing deployable mast system comprising:

a flotation element;

a pivot support connected to said flotation element;

a linkage system comprising a plurality of elongated rigid elements, wherein said rigid elements are attached to said pivot support, and wherein said linkage system pivots about said flotation element;

a sensor means mounted on a first one of said elongated rigid elements; and a counterweight attached to a second one of said elongated rigid elements such that upon deployment of said mast system in water said sensor means is maintained at the desired vertical position by pantographic action.

2. The system of claim wherein said sensor means comprises an antenna.

3. The system of claim 1 wherein said flotation element has a hollow cavity of sufficient size to hold said elongated rigid elements, sensor means and counterweight.

4. The system of claim 3 further comprising a torque motor connected to said flotation element.

5. The system of claim 4 further comprising an inclinometer transducer connected to said first one of said elongated rigid elements for measuring the angular difference between a vertical position and the actual position of the sensor means.

6. The system of claim 5 further comprising an amplifier connected to said inclinometer transducer.

7. The system of claim 1 further comprising a means for extending said elongated rigid elements and sensor means from said flotation element when said flotation element is deployed on the surface of a body of water.

8. The system of claim 7 wherein said means for extending said elongated rigid elements and sensor means from said flotation element comprises a preloaded torsion hairpin spring.

9. The system of claim 7 wherein said means for extending said elongated rigid elements and sensor means from said flotation element comprises a telescoping air spring viscous damper.

10. The system of claim 7 further comprising a torque motor connected to said flotation element.

11. The system of claim 10 further comprising an inclinometer transducer connected to said first one of said elongated rigid elements.

12. The system of claim 11 further comprising an amplifier connected to said inclinometer transducer.

13. The system of claim 12 wherein said flotation element comprises a hollow space of sufficient size to hold said elongated rigid elements, sensor means, torque motor, inclinometer, transducer, amplifier and counterweight.

14. A sensor stabilizing deployable mast system, comprising:

a flotation element;

a pivot support mounted on said flotation element;

a plurality of bars connected to each other by a plurality of pivot joints and pivotally attached to said pivot support;

a sensor means attached to at least one of said bars; and a counterweight attached to at least one of said bars.

15. The deployable mast system of claim 14 wherein said sensor means comprises an antenna.

16. The system of claim 14 wherein said flotation element comprises a hollow space of sufficient size to hold said pivot support, bars, sensor means, and counterweight.

17. The system of claim 16 further comprising a means for extending said pivot support, bars, sensor means and counterweight from said flotation element when said flotation element is deployed on the surface of a body of water.

18. The system of claim 14 further comprising a servo feedback system.

19. The deployable mast system of claim 18 wherein said servo feedback system includes an inclinometer for measuring the angular position of the sensor means and producing a signal corresponding to said angular position; an amplifier for amplifying said signal; and a servo motor for accurately positioning the sensor means.

20. A sensor stabilizing deployable mast system, comprising:

a flotation element having a hollow space therein;

a pivot support mounted on said flotation element;

a torque motor attached to said flotation element;

a first bar mounted to pivot about said pivot support at a point on said first bar between its end points;

a second bar connected at a point between its end points to said first bar at said pivot support;

a third bar and fourth bar each being attached at one of its end points respectively by a first pivot joint and a second pivot joint to respective opposite end points of the second bar;

a fifth bar connected at a point between its end points by a third pivot joint to the end point of said third bar opposite to the end point connected to said second bar, said fifth bar being connected at one of its end points by a fourth pivot joint to an end point of said first bar;

an antenna supported by said fifth bar at the end point of said fifth bar opposite to the end point connected to said first bar;

an inclinometer transducer mounted on said fifth bar at a point between the end points of said fifth bar;

an amplifier attached to said inclinometer transducer;

a sixth bar connected at a point between its end points by a fifth pivot joint to said fourth bar at the end point of said fourth bar opposite to the end point connected to said second bar, said sixth bar being connected at one of its end points by a sixth pivot joint to said first bar at the end point of said first bar opposite to the point which is connected to said fifth bar;

a counterweight supported by said sixth bar at the end point of said sixth bar opposite to the end point connected to said first bar;

said flotation element having a hollow cavity of sufficient size to hold said pivot support, torque motor, bars, antenna, inclinometer transducer, amplifier, and counterweight;

said pivot support, torque motor, bars, antenna, inclinometer transducer, amplifier, and counterweight being positioned within the hollow cavity of said flotation element; and said pivot support, torque motor, bars, antenna, inclinometer transducer, amplifier and counterweight extend from within said flotation element when said flotation element is deployed in the water.

* * * * *